US009495877B2

(12) United States Patent
Duffy et al.

(10) Patent No.: US 9,495,877 B2
(45) Date of Patent: Nov. 15, 2016

(54) AIRSPACE DECONFLICTION SYSTEM AND METHOD

(71) Applicant: The Boeing Company, Chicago, IL (US)

(72) Inventors: Michael J. Duffy, Prospect Park, PA (US); John J. Mattero, Media, PA (US)

(73) Assignee: The Boeing Company, Chicago, IL (US)

( * ) Notice: Subject to any disclaimer, the term of this patent is extended or adjusted under 35 U.S.C. 154(b) by 301 days.

(21) Appl. No.: 14/287,854

(22) Filed: May 27, 2014

(65) Prior Publication Data

US 2015/0348424 A1 Dec. 3, 2015

(51) Int. Cl.
*G08G 5/04* (2006.01)
*G05D 1/00* (2006.01)
*G08G 5/00* (2006.01)

(52) U.S. Cl.
CPC ............ *G08G 5/0013* (2013.01); *G08G 5/006* (2013.01); *G08G 5/0021* (2013.01); *G08G 5/0026* (2013.01); *G08G 5/0052* (2013.01); *G08G 5/0069* (2013.01); *G08G 5/0082* (2013.01)

(58) Field of Classification Search
CPC .. G08G 5/0013; G08G 5/0026; G08G 5/006; G08G 5/0052; G08G 5/0021; G08G 5/0082; G08G 5/0069
See application file for complete search history.

(56) References Cited

U.S. PATENT DOCUMENTS 7,737,878 B2 * 6/2010 van Tooren ......... G01S 13/9303 244/3.1
9,083,425 B1 * 7/2015 Frolov ............... H04B 7/18504
2003/0227395 A1 * 12/2003 Zeineh .................. G01C 21/26 340/988
2010/0114633 A1 * 5/2010 Sislak .................. G06Q 10/047 701/120
2010/0250022 A1 * 9/2010 Hines ................... G05D 1/0094 701/2
2010/0292871 A1 * 11/2010 Schultz .................. G01C 21/00 701/3
2012/0092208 A1 * 4/2012 LeMire ................... G01S 13/87 342/29
2014/0032034 A1 * 1/2014 Raptopoulos ........ G08G 5/0069 701/25
2015/0242972 A1 * 8/2015 Lemmey ............. G06F 21/6218 705/80
2015/0254988 A1 * 9/2015 Wang .................. G05D 1/0214 701/3
2015/0325064 A1 * 11/2015 Downey ............... H04W 48/02 701/29.3

OTHER PUBLICATIONS

US 9,342,987, 05/2016, Wang (withdrawn)*
Jason Short, "Going from 0-60 with APM," *Make* (2014).
Mark Corcoran, "Chinese manufacturer programs Phantom drones with no-fly zones to protect Australian airports," *Radio Australia* (2014).
"DJI—Phantom Firmware Update Safety Feature Integration" https://www.youtube.com/watch?v=YoXAMRQoIAA (2014).

* cited by examiner

*Primary Examiner* — Mussa A Shaawat
(74) *Attorney, Agent, or Firm* — Walters & Wasylyna LLC

(57) ABSTRACT

An aircraft deconfliction system including a registration system having an airspace database, a registered airspace, wherein registration details of the registered airspace are logged in the airspace database, and an aircraft assigned to the registered airspace, the aircraft including a flight control system, a guidance computer controlling the flight control system based on a pilot input, and an override unit in communication with the guidance computer, wherein the override unit overrides the pilot input when the aircraft breaches the registered airspace.

20 Claims, 5 Drawing Sheets

AIRSPACE DECONFLICTION SYSTEM AND METHOD

FIELD

This application relates to airspace deconfliction and, more particularly, to systems and methods for providing safe flight of aircraft, such as unmanned aerial vehicles, in navigable airspace.

BACKGROUND

Various aircraft, including both civilian aircraft and military aircraft, share the navigable airspace. To avoid mid-air collisions, a portion of the navigable airspace, typically referred to as "controlled airspace," is controlled by ground-based air traffic control. Air traffic control communicates with aircraft pilots to effect an orderly flow of air traffic and to avoid both mid-air and on-the-ground collisions. Outside of controlled airspace, aircraft pilots avoid collisions by relying on their sight and sophisticated sense and avoid equipment, such as a traffic collision avoidance system (TCAS) and an automatic dependent surveillance-broadcast (ADS-B).

The introduction into the navigable airspace of unmanned aircraft, such as unmanned aerial vehicles (UAVs or drones), presents concerns of unmanned aircraft-to-manned aircraft collisions, as well as unmanned aircraft-to-unmanned aircraft collisions. These concerns have become more acute with the proliferation of unmanned aircraft and the growing interest in using unmanned aircraft for commercial purposes, such as surveillance (e.g., agricultural surveillance and law enforcement surveillance) and product delivery.

Unmanned aircraft are piloted by ground-based pilots. Therefore, in the case of unmanned aircraft, the ability to use pilot sight to avoid mid-air collisions is drastically reduced, if not completely eliminated. Sophisticated sense and avoid equipment may provide a level of security, but such equipment is expensive and increases vehicle weight, which is a significant concern for already-lightweight unmanned aircraft.

Accordingly, those skilled in the art continue with research and development efforts in the field of airspace deconfliction.

SUMMARY

In one embodiment, the disclosed aircraft deconfliction system may include a registration system having an airspace database, a registered airspace, wherein registration details of the registered airspace are logged in the airspace database, and an aircraft assigned to the registered airspace, the aircraft including a flight control system, a guidance computer controlling the flight control system based on a pilot input, and an override unit in communication with the guidance computer, wherein the override unit overrides the pilot input when the aircraft breaches the registered airspace In another embodiment, the disclosed airspace deconfliction method may include the steps of (1) providing an aircraft having an on-board override unit; (2) assigning a registered airspace to said aircraft; (3) flying said aircraft; (4) while said aircraft is flying, determining with said override unit whether said aircraft is in said registered airspace; and (5) taking remedial action when said aircraft is not in said registered airspace.

Other embodiments of the disclosed airspace deconfliction system and method will become apparent from the following detailed description, the accompanying drawings and the appended claims.

DETAILED DESCRIPTION

Figure 1:
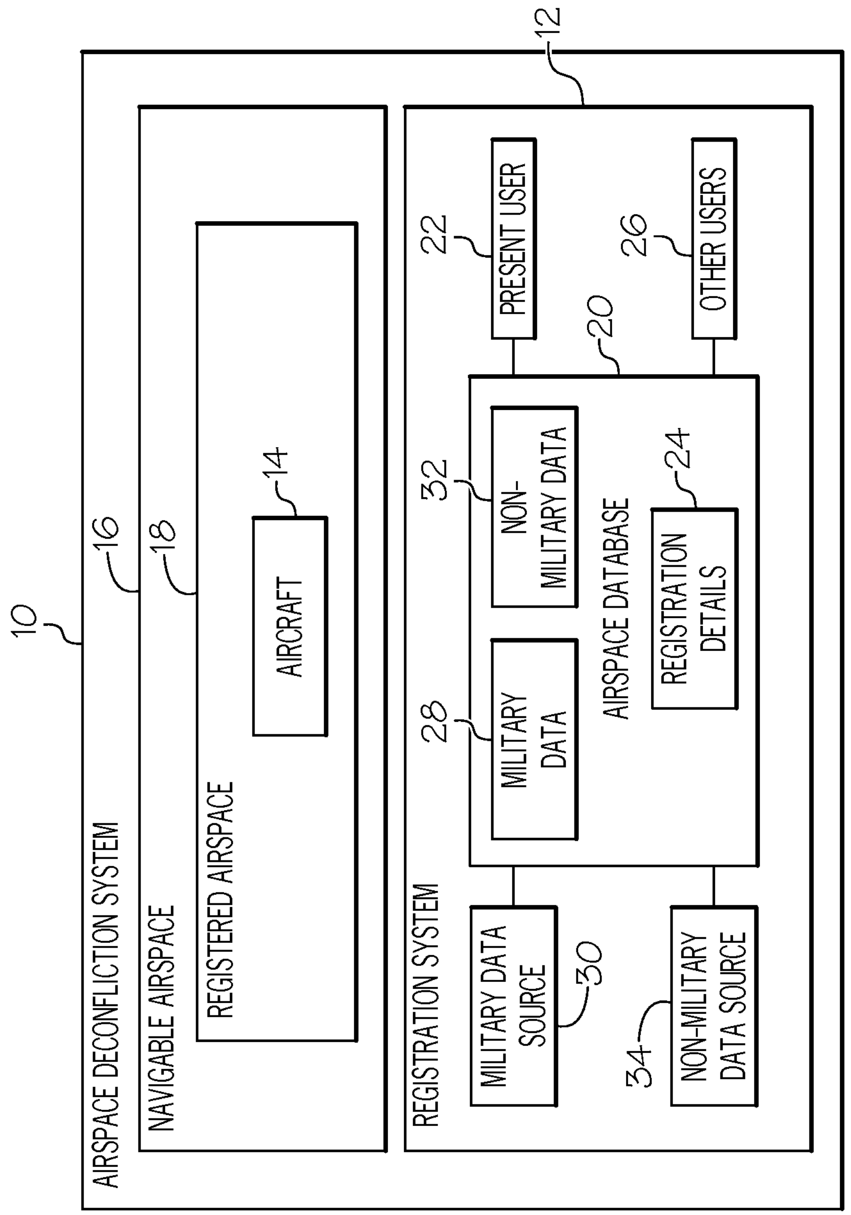
FIG. 1 is a block diagram of one embodiment of the disclosed airspace deconfliction system.

Referring to FIG. 1, one embodiment of the disclosed airspace deconfliction system, generally designated 10, may include a registration system 12 and an aircraft 14. Prior to any flight of the aircraft 14, the registration system 12 may register for the aircraft 14 a registered airspace 18 within the navigable airspace 16. The registered airspace 18 may only exist for a predefined window of time. As described in greater detail herein, the aircraft 14 may be configured such that it is capable of flying only within the registered airspace 18 associated with the aircraft 14, thereby minimizing (if not eliminating) the risk of mid-air collisions between the aircraft 14 and other vehicles (e.g., other aircraft) moving through the navigable airspace 16.

The registered airspace 18 may be a defined volume within the navigable airspace 16, such as a defined volume within Class G airspace of the United States of America. The geographic location of the registered airspace 18 may be known and, as noted above, the registered airspace 18 may only exist for a predefined window of time (e.g., may have a start time and an end time). Therefore, a determination may be made as to whether the aircraft 14 is within the registered airspace 18 based on (1) the geographic location of the aircraft 14 and (2) the time of day.

The boundary of the registered airspace 18 may be ascertainable using various techniques. In a first implementation, the boundary of the registered airspace may be ascertained using a geographic coordinate system, such as latitude, longitude and elevation. As one example of the first implementation, geographic coordinates may be determined using various techniques (e.g., global positioning system (GPS)). In a second implementation, the boundary of the registered airspace may be ascertained using an on-the-ground beacon. As one example of the second implementation, a radio beacon may be broadcast by an on-the-ground beacon station, and the beacon may be detectable by a radio direction finding system on the aircraft 14.

Figure 4:
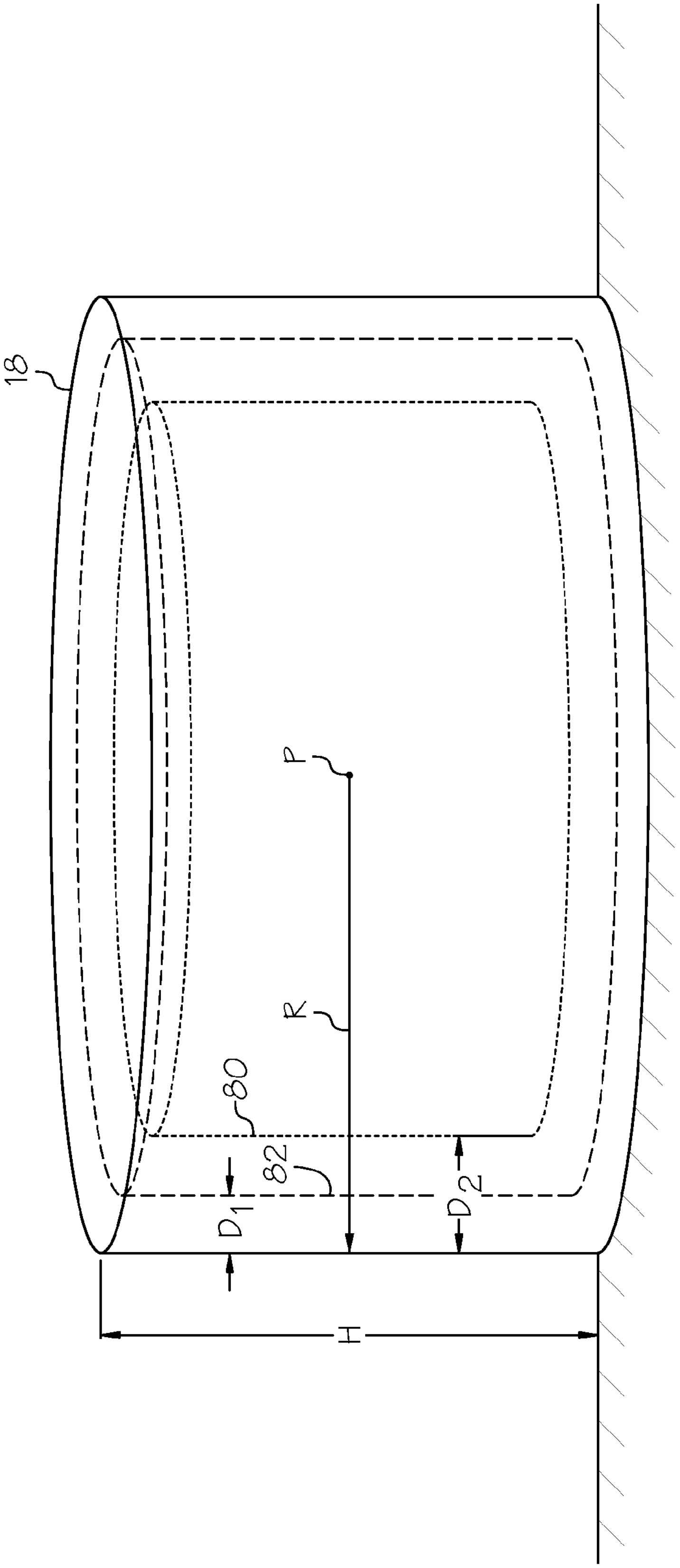
FIG. 4 is a schematic representation of the registered airspace of the airspace deconfliction system of FIG. 1.

As shown in FIG. 4, in one implementation, the registered airspace 18 may be a generally cylindrical volume centered about a center point P. The coordinates (e.g., GPS coordinates) of center point P may be known. Therefore, the boundary of the registered airspace 18 may be defined by a height H above ground level and a radius R extending from the center point P. As one specific, non-limiting example, the registered airspace 18 may have a center point P at a known geographic location (e.g., known latitude and longitude) within the United States of America, the registered airspace 18 may have a height H above ground level of at most about 400 feet, and the registered airspace 18 may have a radius R ranging from about 0.5 miles to about 5 miles.

In another implementation, the registered airspace 18 may be an elongated volume (e.g., a tubular arch) having a first end spaced a distance from a second end. The first end of the elongated volume may coincide with a first location of interest (e.g., a starting/take-off point) and the second end of the elongated volume may coincide with a second location of interest (e.g., an ending/landing point), thereby allowing travel of the aircraft 14 within the navigable airspace 16 using only registered airspace 18.

At this point, those skilled in the art will appreciate that the shape of the registered airspace 18 may vary without limitation, provided that the boundary of the registered airspace 18 is ascertainable and the volume of the registered airspace 18 is sufficient to accommodate the aircraft 14. Those skilled in the art will also appreciate that the size of the registered airspace 18 may vary depending on need, application, constraints of the surrounding navigable airspace 16, among other possible factors.

Still referring to FIG. 1, the registration system 12 may include an airspace database 20. A user 22 may access the airspace database 20 to request registration of the registered airspace 18 prior to flying the aircraft 14 within the registered airspace 18. A request for registration in the airspace database 20 may include an identification of the user 22 and/or the aircraft 14, as well as identification of the desired location of the registered airspace 18 and the desired window of time that the registered airspace 18 will be in existence. When no conflict with other aircraft is found in the airspace database 20, the request for registration may be approved and the registration details 24 (e.g., location and window of time) of the registered airspace 18 may be logged into the airspace database 20.

To facilitate a conflict check in response to a request for registration of registered airspace 18, various data may be logged into the airspace database 20 in addition to the registration details 24 of the present user 22. For example, registration details 24 (e.g., registered airspace locations and windows of time) of other users 26 of the aircraft deconfliction system 10 may be logged into the airspace database 20. Additionally, military data 28, such as flight plans of military aircraft provided by military data sources 30 (e.g., the various branches of the military), and non-military data 32, such as flight plans of commercial aircraft provided by non-military data sources 34 (e.g., air traffic control), may be logged into the aircraft database 20. Such military data 28 and non-military data 32 may be logged into the aircraft database 20 in real time, thereby ensuring accurate conflict checks prior to approval of requests for registration of registered airspace 18.

Thus, the registration system 12 may strive to ensure that the registered airspace 18 assigned to a given aircraft 14 does not overlap with the registered airspace assigned to other aircraft using the disclosed aircraft deconfliction system 10. Additionally, the registration system 12 may strive to ensure that aircraft 14 operating within registered airspace 18 do not conflict with other aircraft (e.g., military and commercial aircraft) operating outside of the disclosed aircraft deconfliction system 10.

Figure 2:
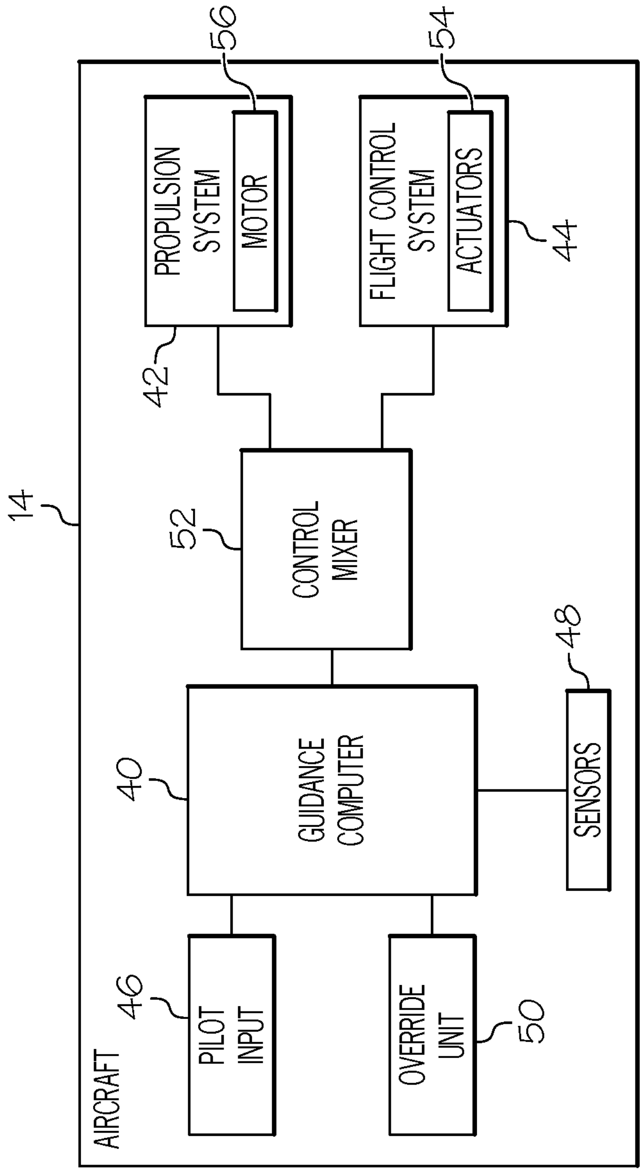
FIG. 2 is a block diagram of the aircraft of the airspace deconfliction system of FIG. 1.

Referring to FIG. 2, the aircraft 14 of the disclosed aircraft deconfliction system 10 (FIG. 1) may include a guidance computer 40, which may control a propulsion system 42 and a flight control system 44 of the aircraft 14 based in pilot input 46, as well as optional inputs from various onboard sensors 48. Additionally, the aircraft 14 of the disclosed aircraft deconfliction system 10 may include an override unit 50, which may override the pilot input 46 and/or disable the aircraft 14 to ensure the aircraft 14 remains within the registered airspace 18 (FIG. 1).

The pilot input 46 may indicate the desired state (e.g., the attitude, the elevation and/or the velocity) of the aircraft 14. The pilot input 46 may be communicated to, and executed by, the guidance computer 40. In one variation, the pilot input 46 may be a real-time, on-board command input, such as a manual command input (e.g., a joystick) provided on-board the aircraft 14. In another variation, the pilot input 46 may be a real-time command input communicated to the aircraft 14 by a remote pilot using wireless transmission, such as in the case of an unmanned aerial vehicle. For example, the pilot input 46 may be a radio control receiver in wireless communication with a radio controller (not shown) operated by a pilot on the ground. In yet another variation, the pilot input 46 may be a predesignated command routine, which the guidance computer 40 may execute in an autopilot mode.

The sensors 48 may be any apparatus or systems that communicate to the guidance computer 40 data regarding the geographic location of the aircraft 14, the attitude of the aircraft 14 and/or the conditions the aircraft 14 has been, currently is or will be experiencing. Non-limiting examples of suitable sensors 48 include inertial measurement units, altimeters, accelerometers, gyroscopes, GPS, barometers, magnetometers, cameras, radar, sonar and the like. Therefore, the guidance computer 40 may compare the data received from the sensors 48 with the pilot input 46 to determine how, if at all, to control the propulsion system 42 and/or the flight control system 44 to achieve the desired state of the aircraft 14.

The guidance computer 40 may receive from the pilot input 46 an indication (e.g., a signal) of a desired state of the aircraft 14 and, considering inputs from the sensors 48, may issue a command required to achieve the desired state of the aircraft 14. The guidance computer 40 may be a processor capable of executing a control algorithm, such as a feedback control algorithm, to minimize the difference (e.g., an error signal) between the desired state of the aircraft 14 and the actual state of the aircraft 14.

The command from the guidance computer 40 may pass to a control mixer 52, which may convert (as necessary) and communicate the command to the propulsion system 42 and/or the flight control system 44 to achieve the desired state of the aircraft 14. As one example, the flight control system 44 may include actuators 54 (e.g., flight surface actuators), and the control mixer 52 may convert desired roll, pitch, yaw and altitude commands into actuator commands. As another example, the propulsion system 42 may include a motor 56 (e.g., an electric motor), and the control mixer 52 may convert desired propulsion commands into motor commands.

Figure 3:
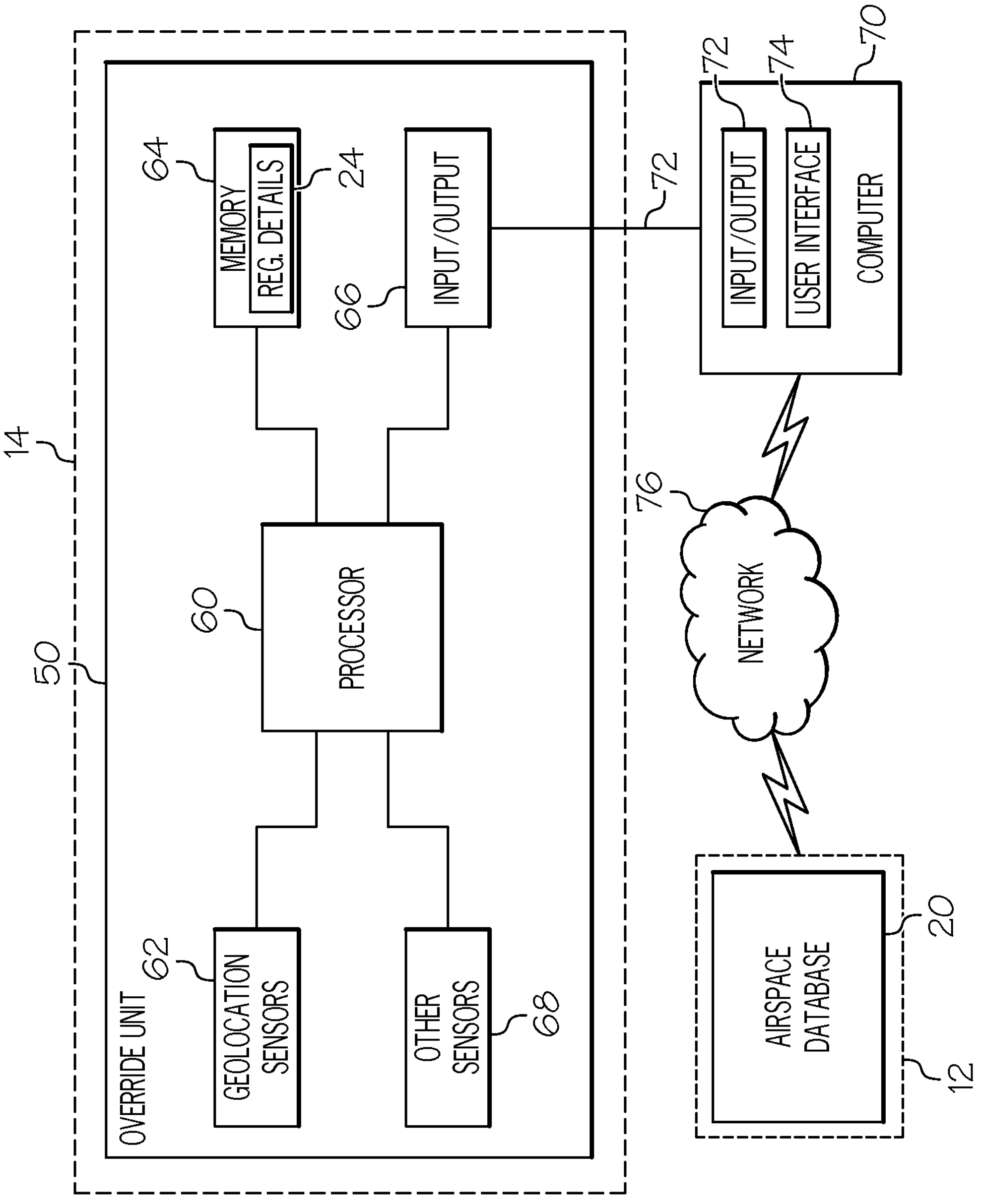
FIG. 3 is a block diagram of the override unit of the aircraft of FIG. 2, shown in communication with the airspace database.

Referring to FIG. 3, the override unit 50 may include a processor 60, a geolocation sensor 62, a memory 64, a communication interface 66 and, optionally, one or more other sensors 68 (e.g., an internal measurement unit and/or an altimeter). The components of the override unit 50, specifically the processor 60, the geolocation sensor 62, the memory 64 and the other sensors 68, may be independent of other, similar components (e.g., sensors 48 (FIG. 2)) associated with the aircraft 14.

Thus, the override unit 50 may be a stand-alone unit. Therefore, the override unit 50, specifically the sensors 62, 68 of the override unit 50, may be certified for use in connection with the disclosed airspace deconfliction system 10 without requiring certification of the entire aircraft 14.

The geolocation sensor 62 of the override unit 50 may be in communication with the processor 60. The geolocation sensor 62 may be any apparatus, system, device, unit or the like capable of ascertaining a geographic location of the override unit 50 and, thus, the aircraft 14. As one specific, non-limiting example, the geolocation sensor 62 may include a GPS sensor, which may express the geographic location of the override unit 50 in terms of latitude and longitude coordinates. As another specific, non-limiting example, the geolocation sensor 62 may include a radio navigation sensor (e.g., a radio direction finding (RDF) system that senses a radio beacon).

The memory 64 of the override unit 50 may be in communication with the processor 60. The memory 64 may be any data storage device capable of storing the registration details 24 (e.g., location and window of time) of the registered airspace 18 registered to the aircraft 14, as well as other data and software (e.g., operating software used by the processor 60). In one specific, non-limiting construction, the memory 64 may be a non-volatile memory, such as flash memory.

The communication interface 66 of the override unit 50 may be any interface that facilitates communication of the override unit 50 with an external computer 70. The communication interface 66 may facilitate the input of data to the override unit 50, the output of data from the override unit 50 or both the input and output of data. For example, the communication interface 66 may be a USB port or the like, thereby facilitating coupling of the override unit 50 to the computer 70 by way of a wired communication path 72 (e.g., a USB cable). Wireless communication with the override unit 50, such as by way of a cellular network, is also contemplated.

The computer 70 may include a communication interface 72 (to facilitate coupling with the override unit 50) and a user interface 74 (e.g., a display screen and a keyboard). The computer 70 may be in communication with the airspace database 20 of the registration system 12 over a network 76 (e.g., the Internet).

During registration of the registered airspace 18 (FIG. 1), the aircraft 14 may be coupled to the computer 70 by way of communication interfaces 66, 72. A user 22 (FIG. 1) may access the airspace database 20 by way of the user interface 74 of the computer 70 and may request registration of the registered airspace 18 by identifying the user 22 and/or the aircraft 14, as well as the desired location of the registered airspace 18 and the desired window of time that the registered airspace 18 will be in existence. If no conflict with other aircraft is found in the airspace database 20, the request for registration may be approved and the registration details 24 (e.g., location and window of time) of the registered airspace 18 may be logged into the airspace database 20, as discussed above, and stored in the memory 64 of the override unit 50 of the aircraft 14.

The processor 60 of the override unit 50 may be in communication with the geolocation sensor 62, the memory 64, the communication interface 66 and the other sensors 68. The processor 60 may include an internal clock. Alternatively (or in addition to an internal clock), the processor 60 may receive time of day information from the geolocation sensor 62, such as when the geolocation sensor 62 includes a GPS sensor, and/or from one of the other sensors 68.

Thus, the processor 60 of the override unit 50 may receive data from the geolocation sensor 62 and, optionally, the other sensors 68, and may compare the location of the override unit 50 and the time of day to the registration details 24 stored in memory 64 to determine whether the aircraft 14 is within the registered airspace 18 (FIG. 1). In the event that the processor 60 determines the aircraft 14 is outside of the registered airspace 18, the processor 60, which may be in communication with the guidance computer 40 (FIG. 2) of the aircraft 14, may issue an override command to the guidance computer 40. The override command issued by the processor 60 to the guidance computer 40 may override the pilot input 46 (FIG. 2) and may disable the aircraft 14 (e.g., cut off power and deploy a parachute), may navigate the aircraft 14 back into the registered airspace 18, or may effect some other remedial action in response to the breach of the registered airspace 18.

Referring to FIG. 4, various thresholds 80, 82 may be defined within the registered airspace 18. As one specific, non-limiting example, an intervention threshold 82 may be defined within the registered airspace 18 and a warning threshold 80 may be defined within the intervention threshold 82. Fewer thresholds (e.g., only one or none) and more thresholds (three or more) may be used without departing from the scope of the present disclosure.

The intervention threshold 82 may define a volume within the registered airspace 18. The intervention threshold 82 may be a boundary located a predefined distance $D_1$ inward from the boundary of the registered airspace 18. For example, the predefined distance $D_1$ may range from about 50 yards to about 0.5 mile.

The warning threshold 80 may define a volume within the registered airspace 18 and within the intervention threshold 82. The warning threshold 80 may be a boundary located a predefined distance $D_2$ inward from the boundary of the registered airspace 18, wherein the predefined distance $D_2$ is greater than the predefined distance $D_1$. For example, the predefined distance $D_2$ may range from about 100 yards to about 1 mile.

In the event that an aircraft 14 (FIG. 2) operating within the registered airspace 18 breaches the warning threshold 80, but remains within the registered airspace 18 and within the intervention threshold 82, as determined by the override unit 50 (FIG. 3), the override unit 50 may issue a warning to the pilot of the aircraft 14. In the event that the aircraft 14 breaches both the warning threshold 80 and the intervention threshold 82, but remains within the registered airspace 18, as determined by the override unit 50, the override unit 50 may override the pilot input 46 (FIG. 2) and may instruct the guidance computer 40 (FIG. 2) of the aircraft 14 to navigate the aircraft 14 back within the intervention threshold 82 (or within the warning threshold 80). In the event that the aircraft 14 breaches both the warning threshold 80 and the intervention threshold 82, as well as the registered airspace 18, as determined by the override unit 50, the override unit 50 may override the pilot input 46 and disable the aircraft 14 (e.g., cut off power to the propulsion system 42), thereby forcing the aircraft 14 to the ground. Optionally, an emergency landing device, such as a parachute, a balloon or the like, may be deployed when the aircraft 14 is disabled.

Accordingly, the disclosed aircraft deconfliction system 10 may perform, by way of a ground-based airspace database 20, a conflict check prior to registering to an aircraft 14 a registered airspace 18. Then, while the aircraft 14 is being operated, the aircraft deconfliction system 10, by way of an on-board override unit 50, may ensure that the aircraft 14 operates only within the registered airspace 18. Therefore, a pilot may safely operate the aircraft 14 without any on-board sense and avoid equipment.

Figure 5:
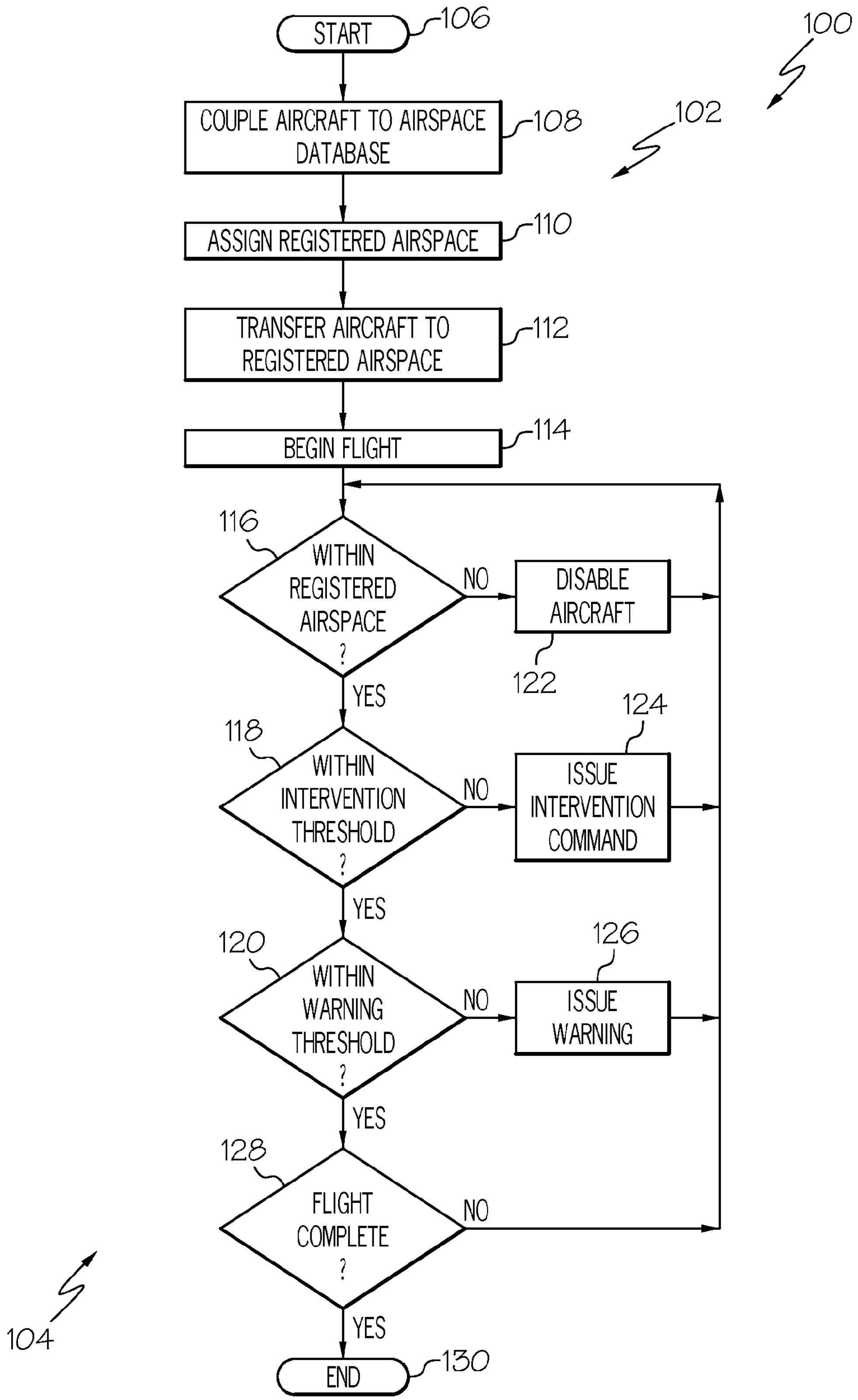
FIG. 5 is a flow chart depicting one embodiment of the disclosed airspace deconfliction method.

Referring to FIG. 5, the disclosed airspace deconfliction method, generally designated 100, may include an on-the-ground aspect 102 and an in-flight aspect 104. The on-the-ground aspect 102 of the method 100 may involve a conflict check and registration of airspace in which no conflict in found. The in-flight aspect 104 of the method 100 may involve monitoring the aircraft (e.g., a UAV) to ensure the aircraft remains within the registered airspace and, if necessary, taking remedial action to avoid a breach of the registered airspace.

The method 100 may begin at Block 106. At Block 108, an aircraft may be coupled to an airspace database, such as by way of an external computer in communication with the aircraft. For example, as shown in FIG. 3, the override unit 50 of the disclosed aircraft 14 may be interfaced with a computer 70, which may access the airspace database 20 of the disclosed registration system 12 by way of a network 76, such as the Internet.

At Block 110, the aircraft may be assigned registered airspace within the broader navigable airspace. For example, as shown in FIG. 1, a user 22 with access (Block 108) to the airspace database 20 may submit a request for registration, which may include an identification of the user 22 and/or the aircraft 14, as well as identification of the desired location of the registered airspace 18 and the desired window of time that the registered airspace 18 will be in existence. When, based on consideration of military data 28, non-military data 32 and registration details 24 of other users 26, no conflict with other aircraft is found in the airspace database 20, the request for registration may be approved and the registration details 24 (e.g., location and window of time) of the assigned registered airspace 18 may be logged into the airspace database 20. If a conflict is found, the user 22 may be prompted to propose alternative options for registration and/or the registration system 12 may propose alternative options.

At Block 112, the aircraft may be transferred to a location on the ground that provides access to the registered airspace. The transfer may occur before or during the window of time that the registered airspace is in existence.

At Block 114, the aircraft may fly within the registered airspace. Prior to take-off, the aircraft may verify that it is within registered airspace. For example, referring to FIG. 3, the geolocation sensor 62 of the override unit 50 of the aircraft 14 may verify the location of the aircraft 14 (and may provide the time of day), and the processor 60 may compare the actual location of the aircraft 14 and the time of day to the registration details 24 (location and window of time) stored in memory 64. If the override unit 50 determines that the aircraft 14 is in registered airspace 18 (FIG. 1), then the override unit 50 may defer to the pilot input 46 (FIG. 2). However, if the override unit 50 determines that the aircraft 14 is not in registered airspace 18, then the override unit 50 may override the pilot input 46 and prevent take-off.

At Blocks 116, 118, 120, the aircraft may be monitored throughout the flight to ensure the aircraft stays within the assigned registered airspace. Specifically, at Block 116, the method 100 may query whether the aircraft is operating within registered airspace. If the aircraft is not operating within registered airspace, remedial action may be taken. For example, as shown in Block 122, the aircraft may be disabled. If the aircraft is determined to be operating within registered airspace, then the method 100 may query whether the aircraft is within the intervention threshold, as shown in Block 118. If the aircraft is not within the intervention threshold, remedial action may be taken. For example, as shown in Block 124, an intervention command may be issued in an attempt to navigate the aircraft back within the intervention threshold. If the aircraft is determined to be within the intervention threshold, then the method 100 may query whether the aircraft is within the warning threshold, as shown in Block 120. If the aircraft is not within the warning threshold, remedial action may be taken. For example, as shown in Block 126, a warning may be issued to the pilot. If the aircraft is determined to be within the warning threshold, then the method 100 may proceed to Block 128.

At Block 128, the method 100 may query whether the aircraft is still in flight. If the aircraft is still in flight, then the method 100 may resume monitoring the geographic location of the aircraft and the time of day to ensure the aircraft stays within the assigned registered airspace. If the flight is complete, then the method 100 may come to an end at Block 130.

Accordingly, the disclosed aircraft deconfliction method 100 may include an on-the-ground aspect 102 that assigns registered airspace and an in-flight aspect 104 that ensures that the aircraft operates only within the assigned registered airspace.

Although various embodiments of the disclosed airspace deconfliction system and method have been shown and described, modifications may occur to those skilled in the art upon reading the specification. The present application includes such modifications and is limited only by the scope of the claims.

What is claimed is:

1. An aircraft deconfliction system comprising:

a registration system comprising an airspace database;

a registered airspace, wherein registration details of said registered airspace are logged in said airspace database; and an aircraft assigned to said registered airspace, said aircraft comprising:

a flight control system;

a guidance computer controlling said flight control system based on a pilot input; and an override unit in communication with said guidance computer, wherein said override unit overrides said pilot input when said aircraft breaches said registered airspace.

2. The system of claim 1 wherein registration details of a plurality of other registered airspaces are logged in said airspace database.

3. The system of claim 1 wherein military data are logged in said airspace database.

4. The system of claim 1 wherein non-military data are logged in said airspace database.

5. The system of claim 1 wherein a threshold is defined within said registered airspace, and wherein said override unit takes remedial action when said aircraft breaches said threshold.

6. The system of claim 5 wherein said remedial action comprises a warning.

7. The system of claim 5 wherein said remedial action comprises issuing an intervention command to said guidance computer.

8. The system of claim 1 wherein said override unit disables said aircraft when said aircraft breaches said registered airspace.

9. The system of claim 8 wherein said aircraft further comprises an emergency landing device, and wherein said emergency landing device is deployed when said aircraft is disabled by said override unit.

10. The system of claim 1 wherein said aircraft further comprises a propulsion system, and wherein said guidance computer controls said propulsion system based on said pilot input.

11. The system of claim 1 wherein said pilot input comprises a radio control receiver.

12. The system of claim 1 wherein said flight control system comprises actuators, and wherein said guidance computer controls said actuators based on said pilot input.

13. The system of claim 1 wherein said override unit comprises a geolocation sensor in communication a processor.

14. The system of claim 13 wherein said geolocation sensor comprises a GPS sensor.

15. The system of claim 1 wherein said override unit comprises a memory in communication a processor, and wherein said registration details are stored in said memory.

16. The system of claim 1 wherein said registration details comprise a location of said registered airspace and a window of time.

17. The system of claim 16 wherein said location is defined by a center point having known geographic coordinates and a radius extending from said center point.

18. The system of claim 1 wherein said aircraft is an unmanned aerial vehicle.

19. An airspace deconfliction method comprising the steps of:

providing an aircraft having an on-board override unit;

assigning a registered airspace to said aircraft;

flying said aircraft;

while said aircraft is flying, determining with said override unit whether said aircraft is in said registered airspace; and taking remedial action when said aircraft is not in said registered airspace.

20. The method of claim 19 wherein said taking said remedial action comprises at least one of issuing a warning, issuing an intervention command, and disabling said aircraft.

* * * * *